United States Patent [19]
Horley et al.

[11] Patent Number: 4,730,033
[45] Date of Patent: Mar. 8, 1988

[54] COATING COMPOSITIONS

[75] Inventors: Susan M. Horley, High Wycombe; Auguste L. L. Palluel, Windsor; Philip L. Taylor, Slough, all of England

[73] Assignee: Imperial Chemical Industries PLC, London, England

[21] Appl. No.: 941,506

[22] Filed: Dec. 12, 1986

Related U.S. Application Data

[63] Continuation of Ser. No. 790,987, Oct. 24, 1985, abandoned.

[30] Foreign Application Priority Data

Nov. 5, 1984 [GB] United Kingdom ............... 8427942
Jun. 12, 1985 [GB] United Kingdom ............... 8514904

[51] Int. Cl.$^4$ .................... C08G 63/44; C08G 69/44
[52] U.S. Cl. ................................. 528/288; 525/437; 525/438; 525/440; 525/444.5; 525/447; 528/99; 528/125; 528/128; 528/183; 528/199; 528/293; 528/295.5; 528/297; 528/306
[58] Field of Search ............. 528/297, 306, 288, 293, 528/295.5, 99, 125, 128, 183, 199; 525/437, 438, 440, 444.5, 447

[56] References Cited

U.S. PATENT DOCUMENTS

| | | | |
|---|---|---|---|
| 3,479,323 | 11/1969 | Jones | 528/274 |
| 3,882,088 | 5/1975 | Thompson | 528/288 |
| 4,340,716 | 7/1982 | Hata et al. | 528/100 |
| 4,485,220 | 11/1984 | Hefner et al. | 528/288 |
| 4,501,852 | 2/1985 | Markusch et al. | 524/591 |
| 4,533,703 | 8/1985 | Panagiotis et al. | 525/440 |

FOREIGN PATENT DOCUMENTS

| | | |
|---|---|---|
| 588018 | 5/1947 | United Kingdom . |
| 846378 | 8/1960 | United Kingdom . |
| 1307469 | 2/1973 | United Kingdom . |

Primary Examiner—Lucille M. Phynes
Attorney, Agent, or Firm—Cushman, Darby & Cushman

[57] ABSTRACT

Coating compositions which are capable of curing at room temperature comprise (i) a condensation polymer in which the polymer backbone contains at least one grouping of the formula —CO—C(R)=C(R)—CO—, where R is hydrogen, a halogen or an alkyl or aryl group, and (ii) a compound carrying at least three primary amine or thiol groups. The compositions are of particular interest as undercoats in the automobile refinish trade.

8 Claims, No Drawings

COATING COMPOSITIONS

This is a continuation of application Ser. No. 790,987, filed Oct. 24, 1985, which was abandoned upon the filing hereof.

This invention relates to coating compositions which are capable of becoming cured at ambient temperatures; in particular, it relates to such compositions which are based on an unsaturated condensation polymer of specified structure together with a compound carrying nucleophilic groups of specified type.

It has already been proposed to utilise, as a mechanism for the curing by crosslinking of certain unsaturated addition polymers, an addition reaction between an activated ethylenic double bond and a nucleophilic group containing an active hydrogen atom. The practical applications of this reaction to curable compositions involve in particular as the reactive species a polymer containing α,β-unsaturated carbonyl groupings and compounds containing a plurality of amino groups. Thus in U.S. Pat. Nos. 4,251,597 and 4,303,563 there are described coating compositions comprising a poly(acryloxy) compound together with an addition polymer carrying a plurality of terminal and/or pendant primary or secondary amine groups. In U.S. Pat. Nos. 4,299,867 and 4,373,008 there are described analogous compositions where the addition polymer carries a plurality of substituted oxazolidine groups instead of free amine groups; under the influence of atmospheric moisture, the oxazolidine groups undergo hydrolysis to liberate free amino groups which then react with the poly(acryloxy) compound also present. In each of the above-mentioned patents, the poly(acryloxy) compound, such as ethylene glycol diacrylate or trimethylolpropane triacryloxypropionate, or alternatively a compound of polymeric structure obtained by reacting a hydroxyl group-containing polymer, such as a polyester or a polyether polyol, with a compound containing an acryloxy group, such as acrylic acid. In all these polymeric poly(acryloxy) compounds, the activated ethylenic double bonds are contained within groupings which are either terminal to or pendant from the polymer backbone.

We have now found that coating compositions having the valuable property of curing at or near room temperature by means of the above-mentioned addition reaction can be made by bringing together a condensation polymer containing activated double bonds in the polymer backbone and a compound carrying at least three primary amino groups or at least three thiol groups.

According to the present invention there is provided a curable coating composition which comprises:

(i) a condensation polymer in which the polymer backbone of each molecule on average contains at least one activated unsaturated grouping of the formula

   I where R is hydrogen, a halogen or an alkyl or aryl group; and (ii) a compound carrying at least three primary amino groups, one or more of which may be in latent form as hereinafter defined, or a compound carrying at least three thiol groups.

Condensation polymers suitable as component (i) of the compositions include in particular polyesters which are obtained in known manner by reacting a dicarboxylic acid of the formula

   II or an ester-forming derivative thereof, with one or more polyols.

Particularly suitable dicarboxylic acids of the formula (II) are maleic acid and fumaric acid; suitable ester-forming derivatives of these include the corresponding lower alkyl, for example methyl or ethyl, esters and, in the case of maleic acid, the corresponding anhydride. Suitable polyols include diols such as ethylene glycol, propylene glycol, 1,3-propane diol, butylene glycol, 1,4-butane diol, 1,6-hexane diol, neopentyl glycol, triols such as glycerol, trimethylolpropane, trimethylolethane, 1,2,6-hexane triol, tetrols such as pentaerythritol and higher polyols such as sorbitol. Mixtures of any two or more of these polyols may be employed. In place of, or in addition to, a polyol, there may be reacted with the dicarboxylic acid a compound containing two or more epoxy groups, for example an epoxy resin of the type obtained by reacting bisphenol-A with epichlorhydrin. In this case, the resulting polyester contains a hydroxyl group immediately adjacent to each ester grouping in which the residue of the epoxy compound participates.

In addition to the unsaturated dicarboxylic acid of the formula (II), the reactants from which the polyester is made may also include one or more other polycarboxylic acids, for example saturated aliphatic dicarboxylic acids such as succinic acid, glutaric acid, adipic acid and sebacic acid, and aromatic polycarboxylic acids such as phthalic acid, isophthalic acid, terephthalic acid and trimellitic acid. Ester-forming derivatives of such acids, for example phthalic anhydride, may be used in place of the free acids. The relative proportions used of the dicarboxylic acid (II) and of any other polycarboxylic acid should, however, be chosen so that the above-defined requirement of an average of at least one residue of the dicarboxylic acid (II) per polyester molecule is satisfied. In practical terms, this means that normally at least 20%, and preferably at least 50%, of the ester linkages in the polymer backbone of the polyester should be derived from the dicarboxylic acid (II). The overall proportion of total hydroxyl group-bearing reactants to total carboxyl group-bearing reactants may be varied in accordance with principles well understood in the polyester art; usually a slight to moderate excess of the polyol reactants will be employed so as to produce a polyester of low acid value. Also, the relative proportions of reactants of functionality (with respect to either hydroxyl or carboxyl groups) greater than two will be regulated, again as well known in the art, in order to avoid the production of gelled material. Conventional reaction temperatures, e.g. in the range 100° C. to 300° C. may be used; the reaction may if desired be carried out in the presence of a solvent, particularly one, such as xylene, capable of forming an azeotrope with the water of reaction.

In the term "polyester" we include also urethane-ester polymers satisfying the above definition. Such polymers may be made by reaction of a dicarboxylic acid (II), one or more polyols and a polyisocyanate, optionally together with one or more of the other polycarboxylic acids mentioned above. In these polymers, the polyisocyanate effectively takes the place of all or part of the other polycarboxylic acid, and is considered as equivalent thereto when selecting the relative proportions of the reactants from which the urethane-ester polymer is derived. Suitable polyisocyanates include tolylene diisocyanate, hexamethylene diisocyanate, isophorone diisocyanate, diphenylmethane diisocyanate and xylylene diisocyanate.

In making the urethane-ester polymer, all the starting material, including the polyisocyanate, may be reacted together in the normal way as for conventional polyester preparation; alternatively all the starting materials except the polyisocyanate may be reacted together in a first step to form a "base" polyester of high hydroxyl value, following which a proportion of the hydroxyl groups in the latter are reacted with the polyisocyanate.

In both the polyesters and the urethane-ester polymers as mentioned above, there may if desired be present autoxidisable groupings derived from drying oil or semi-drying oil fatty acids, such acids having been included in the starting materials from which the polymers are made. Suitable acids include the fatty acids from linseed oil, soya bean oil, tall oil, sunflower oil, safflower oil and rapeseed oil. The resulting alkyd or urethane alkyds exhibit, in addition to the initial rapid cure brought about by the reaction with the component (ii) of the compositions of the invention, a further, slower cure involving the agency of atmospheric oxygen such as is exhibited by conventional air-drying coating compositions.

The component (ii) of the compositions may be, as hereinbefore defined, a compound carrying at least three primary amino groups, or such a compound wherein one or more of those groups is present in latent form. By "latent form" we mean that each group in question is in the form of a derivative which is capable of reverting to a primary amino group under the conditions to which the composition is exposed in order to bring about curing.

Compounds which are useful as components (ii) include those of the aliphatic, cyclo-aliphatic and aromatic series containing three or more free primary amino groups. Examples of such compounds include tris-(2-aminoethyl)amine, N(CH$_2$CH$_2$NH$_2$)$_3$ and the products of the "Jeffamine" series (Registered Trade Mark) manufactured by Jefferson Chemical Co. and having the general structure

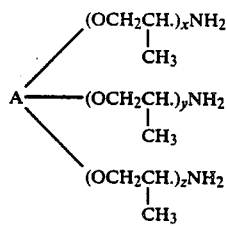

where A is the residue of an aliphatic triol and x,y, and z are integers the sum of which may vary between 5 and 85.

Compounds also useful as the component (ii) are those in which one or more of the minimum of three primary amino groups is present in latent form as a ketimine or aldimine derivative formed by condensation of a primary amino group with a ketone such as acetone, methyl ethyl ketone, methyl isobutyl ketone or cyclohexanone, or with an aldehyde such as acetaldehyde or propionaldehyde. In this way, the primary amino group is converted to a grouping of the formula

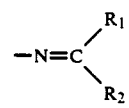

where R$_1$ is an alkyl group and R$_2$ is hydrogen or an alkyl group. In a case where the polyamine may also contain hydroxyl groups in the form of groupings of the structure

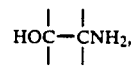

the latter may similarly be reacted with a ketone or an aldehyde to yield oxazolidine groupings of the formula

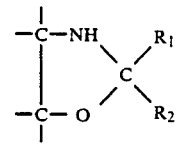

where R$_1$ and R$_2$ have the same significance as before. Any of these latent or "blocked" primary amino groups are readily hydrolysed back to the corresponding free groups in the presence of water. Other forms of latent amino groups which may be used include chelate derivatives and salts thereof.

Suitable compounds containing three or more primary amino groups may be made by joining together molecules containing less than three such groups but containing other functional groups such as secondary amino groups or hydroxyl groups. If the primary amino groups are blocked by ketimine or aldimine formation as mentioned above, the other functional groups can then be linked together through a polyfunctional co-reactant such as a polyisocyanate or a polyepoxide. Thus, diethylene triamine may be converted to the bis-ketimine by reaction with methyl isobutyl ketone, then condensed via the remaining free secondary amino group with a polyisocyanate or a polyepoxide. The resulting condensation product contains at least four latent primary amino groups and it may be used directly as the component (ii), since the ketimine blocking groups are readily removed by the effect of atmospheric moisture when the composition of the invention is spread as a film. Alternatively, the condensation product may be subjected to a separate hydrolysis step in which the free primary amino groups are restored. In forming the condensation product, it may be desirable to use an excess of the polyisocyanate or polyepoxide in order to ensure complete reaction of the ketimine; the condensation step may then be immediately followed by reaction of the product with a lower alcohol such as butanol in order to eliminate any residual free isocyanate or epoxide groups.

Various other ways of producing suitable highly functional amine components (ii) will be apparent to those skilled in the art. For example, 3 molar proportions of a di-primary amine such as 1,6-hexanediamine may be reacted with 1 molar proportion of a lower aliphatic ester of maleic acid, such as dimethyl maleate; the first molecule of the diamine undergoes addition to the double bond in the ester and the other two molecules effect aminolysis of the ester groups, resulting in the production of a triprimary amine.

The more complex types of amine component (ii) which have been described are in general to be preferred to the simpler types on the grounds of their lower volatility, lower toxicity and better compatibility with the polyester component (i). However, the suitability of any polyamine in a particular case can readily be established by experiment.

Instead of being a compound carrying at least three primary amino groups, the component (ii) may be a compound carrying at least three thiol groups. An example of such a compound is that having the general structure

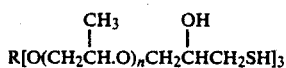

where n is 1 or 2 and R is an aliphatic hydrocarbyl group; this product is sold by Diamond Shamrock Corporation under the name "Capcure 3-800" (Registered Trade Mark). Another such compound which is commercially available is pentaerythritol tetrakis(mercaptopropionate, $C(CH_2O.CO.CH_2CH_2SH)_4$.

Reaction between the condensation polymer component (i) and the component (ii), in the case where the latter contains free primary amino groups, occurs spontaneously and rapidly at room temperature. Where the component (ii) contains primary amino groups in latent form, the initiating of reaction will require the operation of some external agency whereby the groups become released. As already mentioned, this may be the action of atmospheric moisture which takes effect when a film of the composition is spread; such moisture will bring about hydrolysis of primary amino groups which have been blocked by ketimine or aldimine or oxazolidine formation. Where the component (ii) contains thiol groups, it is usually desirable to introduce a catalyst in order to ensure reaction with the component (i); suitable catalysts are, for example, tertiary amines such as triethylamine.

The coating compositions may in principle be formulated as either "two-pack" or "one-pack", depending on the form used of the component (ii), but, where latent primary amino groups which are readily hydrolysed are involved, the scope for formulating one-pack compositions may in practice be limited to that of clear, unpigmented materials since it is very difficult to obtain pigments in a completely moisture-free condition. The present compositions are of particular interest in two-pack, pigmented form for use as undercoats in the automobile refinish, aircraft and marine trades, where there is little or no possibility of heat being applied in order to cure the coating. Such undercoat compositions may be either of the primer/surfacer type, to be applied to the substrate in a relatively thin film as preparation for the subsequent application of a topcoat or of the primer/filler type which is more thickly applied and is capable of levelling out small surface irregularities and imperfections in the substrate. At the present time, these undercoat compositions are commonly of the two-pack type based on a hydroxyl group-containing acrylic or polyester resin in conjunction with a polyisocyanate; the compositions of the invention have a positive advantage over these in avoiding the use of polyisocyanates under circumstances of application where proper facilities for handling toxic intermediates may not be available.

In the compositions of the invention, the unsaturated condensation polymer component (i) and the amine or thiol component (ii) are normally reacted together in proportions such as to provide approximately one amino or thiol group for each double bond present. A deficiency of the component (ii) may be used if a reduced rate of curing of the composition is desired, but it is preferred to use at least about 0.5 amine or thiol group for each double bond.

The compositions will normally contain, in addition to the components (i) and (ii) and optionally one or more pigments and/or fillers, one or more solvents such as are conventionally employed in the coatings art, for example xylene, ethyl acetate, butyl acetate, methyl isobutyl ketone, propylene glycol monomethylether and propylene glycol monomethylether acetate.

They may also contain other conventional paint additives such as fillers, plasticisers, flow control agents and UV absorbers.

When applied to a substrate under normal conditions of temperature and humidity, the compositions become sufficiently cured to withstand the over-application of a top-coat within 2 hours; curing is usually substantially complete within a period of 10–20 hours. Curing can, if desired and where practicable, be accelerated by subjecting the applied coating to a moderately elevated temperature, e.g. one in the range 60°–80° C.

In the context of their use as undercoats for automobile body refinishing, as already mentioned, the compositions possess the advantage of giving films having excellent resistance to attack by petrol or solvents, in addition to their property of being able to accept overcoating after only a short curing period. The compositions are, however, valuable for application to a wide variety of other substrates, including other metal structures and articles such as aircraft, ships and domestic or agricultural equipment, and articles made of wood and plastics.

The invention is illustrated by the following Examples, in which parts are by weight.

EXAMPLES

Polyester Preparation I

The following mixture of ingredients:

| | |
|---|---|
| Propylene glycol | 437 parts |
| Maleic anhydride | 352 parts |
| Phthalic anhydride | 53 parts |
| Adipic acid | 157 parts | was reacted at 150°–210° C. in the presence of 30 parts of toluene for a period of about 5 hours, until the acid value of the product had fallen to approximately 28 mg KOH/g. Whilst still hot, the polyester was thinned by the addition of 176 parts of xylene, then allowed to cool.

Polyester Preparation II

The following mixture of ingredients:

| | |
|---|---|
| Trimethylolpropane | 40 parts |
| Cyclohexyldimethanol | 108 parts |
| Neopentyl glycol | 343 parts |
| Maleic anhydride | 309 parts |
| Isophthalic anhydride | 174 parts | was reacted at 150°-220° C. in the presence of 30 parts of toluene for a period of about 6 hours, until the acid value of the product had fallen to approximately 18 mg KOH/g. Before being cooled, the polyester was thinned by the addition of a blend of 599 parts of xylene and 599 parts of butyl acetate.

Polyester Preparation III

A mixture of 190 parts of an epichlorhydrin-bisphenol-A condensate ("Epikote" 828 ex. Shell Chemicals Co.: "Epikote" is a Registered Trade Mark), 58 parts of fumaric acid, 83 parts of xylene and 83 parts of methyl isobutyl ketone was heated together at 120° C. for 2 hours in the presence as catalyst of 2.5 parts of N,N-dimethylcocoamine ("Armeen" DMCD ex. Armour Chemical Co.: "Armeen" is a Registered Trade Mark). The resulting polyester was further thinned before cooling by the addition of 138 parts of propylene glycol monomethyl ether.

Polyamine Preparation A

A mixture of 87 parts of the diketimine formed by condensation of diethylene triamine and methylisobutylketone, and 62 parts of an epichlorhydrin-bisphenol A condensate ("Epikote" 828) was heated in 123 parts of methyl isobutyl ketone at 90° C. for 3 hours.

Polyamine Preparation B

A mixture of 363 parts of the diketimine described in Preparation A above and 300 g of a 75% solution in 50:50 xylene:ethylene glycol monoethyl ether acetate of hexahexamethylene diisocyanate trimer ("Desmodur N(" ex. Bayer Chemicals Co.: "Desmodur" is a Registered Trade Mark), in a solvent blend consisting of 263 parts of methyl isobutyl ketone, 246 parts of xylene and 50 parts of ethylene glycol monoethyl ether acetate, was stirred at room temperature for about 45 minutes. When the reaction was complete, any free isocyanate groups remaining in the product were destroyed by addition of 100 parts of n-butanol at room temperature.

Polyamine Preparation C

A mixture of 363 parts of the diketimine described in Preparation A above and 387 parts of a trimethylolpropane/tolylene diisocyanate reaction product ("Desmodur L" ex. Bayer Chemicals Co.), in a solvent blend consisting of 263 parts of methyl isobutyl ketone, 300 parts of xylene and 129 parts of ethyl acetate, were stirred at room temperature for about 45 minutes. When the reaction was complete, any free isocyanate groups remaining in the product were destroyed by addition of 100 parts of n-butanol.

Polyamine Preparation D

A mixture of 87 parts of 1:6-hexane diamine, 43 parts of dimethyl maleate and 190 parts of toluene was heated at 100° C. for 6 hours. The solvent was removed under reduced pressure and the residual product redissolved in a mixture of 86 parts of toluene and 86 parts of ethanol.

Polyamine E

This was tris-(2-aminoethyl)amine, $N(CH_2CH_2NH_2)_3$.

Polythiol Y

This was the product "Capcure 3-800", marketed by Diamond Shamrock Corporation and referred to in the preceding discussion.

Preparation and Testing of Coating Compositions

The polyesters and polyamines described above were blended together in the combinations and proportions shown in Table I below, with the incorporation of a solvent also as shown. Each blend was spread on to a glass panel, using a 200-micron spreader, and the resulting film allowed to air-dry for 16 hours.

Each film was then subjected to tests for hardness and petrol and solvent resistance, with the results shown in Table II below. Hardness was measured by the Erichsen pendulum test. Petrol resistance was determined by placing a petrol-soaked pad upon the film and leaving it there, covered, for 1 hour; the film was then inspected. Solvent resistance was assessed by counting the number of double rubs with a pad soaked in methyl ethyl ketone which the film would withstand without damage.

TABLE I

| Example Blend No. | Component (i) parts | Component (ii) parts | Solvent parts |
|---|---|---|---|
| 1 | Polyester I (10) | Polyamine A (10.7) | Xylene (5.5) |
| 2 | Polyester I (10) | Polyamine B (15.8) | Xylene (4.8) |
| 3 | Polyester I (10) | Polyamine D (9.6) | Xylene (4.0) |
| 4 | Polyester II (10) | Polyamine B (6.3) | Xylene (2.9) |
| 5 | Polyester II (10) | Polyamine C (7.7) | Xylene (3.5) |
| 6 | Polyester II (10) | Polyamine E (0.7) | MEK* (0.7) |
| 7 | Polyester III (10) | Polyamine B (5.7 | PGME** (2.0) |
| 8 | Polyester II (10) | Polythiol Y+(4.5) | MEK (4.5) |

*Methyl ethyl ketone
**Polypropylene glycol monomethyl ether
+With the addition of triethylamine (0.2 part)

Preparation and Testing of Comparative Coating Compositions

Comparative Composition 9

This composition represents a conventional isocyanate-cured acrylic system.

A hydroxyl group-containing acrylic copolymer was made by copolymerising a monomer mixture of the following composition:

| | |
|---|---|
| Methyl methacrylate | 21.9% |
| Styrene | 21.9% |
| Hydroxyethyl methacrylate | 16.1% |
| Acrylic acid | 9.1% |
| "Cardura" E10 (Shell Chemicals) | 31.0% | in solution in a 2:1 xylene-ethylene glycol monoethyl ether acetate mixture at about 140° C. in the presence of a peroxide catalyst. ("Cardura" is a Registered Trade Mark).

A comparative coating composition was prepared by blending 13.52 parts of the above-described acrylic copolymer with 4.54 parts of "Desmodur" N, 0.14 part of a dibutyltin dilaurate catalyst solution (0.5% in xylene), 0.10 part of a zinc octoate catalyst solution (2.2% in 9:91 white spirit:butyl acetate) and 4.20 parts of butyl acetate.

Comparative Composition 10

This composition represents a system curing by the same addition reaction as that which the invention utilises, but one in which the polyester contains unsaturation in terminal or pendant groups instead of in the polymer backbone, as described in the U.S. patents referred to above.

A hydroxyl group-containing polyester was prepared from the following ingredients:

| Propylene glycol | 437 parts |
| Succinic anhydride | 359 parts |
| Phthalic anhydride | 53 parts |
| Adipic acid | 157 parts | by reacting them at 150°-190° C. in the presence of 30 parts of toluene for a period of about 5 hours, until the acid value of the product had fallen to approximately 4 mg KOH/g. The polyester was then reacted with 100 parts of acrylic acid, in the presence of 2 parts of tert-butylcatechol, by heating at 190° C. for 6 hours. The final product had an acid value of 3 mg KOH/g; it was thinned by the addition of 334 parts of xylene.

A comparative coating composition was prepared by blending 10.00 parts of the above-described product with 6.13 parts of polyamine B described above and 2.85 parts of xylene.

Compositions 9 and 10 were each applied to glass panels, allowed to air-dry and tested in the manner described above for blends 1-8. The test results are given in Table II below.

TABLE II

| Example Blend No. | Hardness, seconds | Petrol resistance | Solvent resistance |
|---|---|---|---|
| 1 | 9 | Unaffected | — |
| 2 | 9 | " | — |
| 3 | 20 | Slightly softened | — |
| 4 | 13 | Unaffected | >200 |
| 5 | 41 | " | 40 |
| 6 | 18 | V. slightly softened | 69 |
| 7 | 30 | Unaffected | >200 |
| 8 | 11 | Slightly softened | 56 |
| 9 (comparative) | 27 | Softened | 90 |
| 10 (comparative) | 7 | " | 100 |

Polyester Preparation IV

A mixture of 19.8 parts of trimellitic anhydride, 516.0 parts of "Dianol 33" (Registered Trade Mark) ex Akzo Chemie and 123.6 parts of maleic anhydride was reacted together until the acid value had fallen to 15 mg KOH/g non-volatile. The product was then thinned to a non-volatile content of 50% with a 1:1 blend of xylene and propylene glycol monomethyl ether. ("Dianol 33" is believed to have the structure

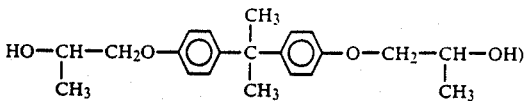

Polyamine Preparation F (i) A ketimine was prepared by mixing 278.0 parts of diethylene triamine, 583.0 parts of cyclohexanone and 289.0 parts of xylene, and then heating the mixture at 164° C. for 5 hours, with the removal of 111.0 parts of water.

(ii) A mixture of 155.8 parts of "Desmodur N3300" Registered Trade Mark) ex Bayer, 250.0 parts of the ketimine solution prepared in (i) above, 168.5 parts of propylene glycol monomethyl ether acetate and 99.8 parts of xylene was allowed to react at room temperature for 30 minutes. There were then added 45.0 parts of n-butanol in order to destroy any remaining free isocyanate groups.

Polyamine Preparation G (i) A mixture of 500 parts of "Epikote 828" (Registered Trade Mark) ex Shell Chemicals, dissolved in 400 parts of xylene and 62.1 parts of "Synprolam 35N3" (Registered Trade Mark) ex I.C.I. PLC, dissolved in 100 parts of butyl acetate was heated at 50° C. for 6 hours.

(ii) A mixture of 443.8 parts of the product from preparation G(i) and 250.0 parts of the ketimine solution prepared in F(i) above, together with 112.5 parts of propylene glycol monomethyl ether acetate, was heated at 80° C. for 5 hours.

("Synprolam 35N3" has the structure R-NH(CH$_2$)$_3$NH$_2$, where R is a C$_{13}$-C$_{15}$ alkyl group).

Polyamine Preparation H

A mixture of 130.4 parts of "Epikote 155" (an epoxidised phenolic resin) ex Shell Chemicals, 243.5 parts of the ketimine solution as prepared in part (i) of Preparation F above, 153.5 parts of propylene glycol monomethyl ether acetate and 86.5 parts of xylene was heated at 110° C. for 3 hours.

Polythiol Z

This was pentaerythritol tetrakis(mercaptopropionate), C(CH$_2$O CO.CH$_2$CH$_2$SH)$_4$.

Preparation and Testing of Coating Compositions

The polyester IV described above was pigmented in conventional fashion and was then blended with each in turn of the polyamine preparations F, G and H and the polythiol Z, the pigment volume concentration in each blend being 50%. The quantities of the polyester and polyamine taken are shown in Table III below. Each blend was applied by spray on to steel panels, using one single and one double pass of the spray gun so as to give a total film thickness of about 75 microns. The resulting films were allowed to air-dry for 2 hours.

Each dried film was then tested for hardness and solvent resistance in the way described above. The results are given in Table III, together with, by way of comparison, the corresponding results for a conventional isocyanate-cured hydroxyacrylic type of composition.

TABLE III

| Example Blend No. | Component (i) parts | Component (ii) parts | Hardness seconds | Solvent resistance. |
|---|---|---|---|---|
| 11 | Polyester IV (10) | Polyamine F* (2.1) | 18 | >100 |
| 12 | " | Polyamine G* (2.3) | 11 | 84 |
| 13 | " | Polyamine H* (2.2) | 20 | >100 |
| 14 | " | Polythiol Z+ (1.2) | 11 | 43 |
| 15 (comparative) | — | — | 16 | >100 |

*In each instance, the indicated quantity of the polyamine was thinned before blending with the polyester by addition of 4.1 parts of a 45/45/10 mixture of acetone/toluene/propoxypropanol.
+With the addition of triethylamine (0.12 part) and methyl ethyl ketone (1.2 parts); in this case the polyester IV was not pigmented and the coating composition was applied as described for Examples 1-8.

We claim:

1. A curable coating composition which comprises:
   (i) a condensation polymer in which the polymer backbone of each molecule on average contains at least one active unsaturated grouping of the formula

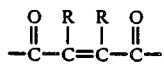

where R is hydrogen, a halogen or an alkyl or aryl group, and
   (ii) a compound carrying at least three primary amino groups, one or more of which may be in the form of a derivative which is capable of reverting to a primary amino group under the curing conditions to which the composition is exposed.

2. A composition according to claim 1, wherein the condensation polymer (i) is a polyester obtained by reacting a dicarboxylic acid of the formula

or an ester-forming derivative thereof, with one or more polyols or compounds containing epoxy groups.

3. A composition according to claim 1, wherein the dicarboxylic acid, or derivative thereof, is selected from the group consisting of maleic acid, fumaric acid, maleic anhydride and the lower alkyl esters of maleic acid and fumaric acid.

4. A composition according to claim 1, wherein the compound (ii) is tris-2-(2-aminoethyl)amine, which has the formula $N(CH_2CH_2NH_2)_3$.

5. A composition according to claim 1, wherein the compound (ii) has the general structure,

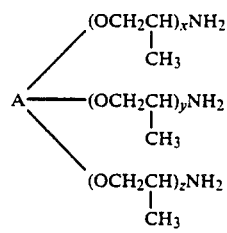

where A is the residue of an aliphatic triol and x, y and z are integers the sum of which lies in the range 5-85.

6. A composition according to claim 1, wherein the condensation polymer (i) and the compound (ii) are taken together in proportions such as to provide about 1.0 amine group for each double bond present.

7. A composition according to claim 1 where the compound carrying at least three primary amino groups is the reaction product of diketimine (formed by condensation of diethylene triamine and methylisobutyl ketone) and trimethylolpropane/toluene diisocyanate reaction product.

8. A composition according to claim 1 where the compound carrying at least three primary amino groups is the reaction product of a molecular excess of a bisphenol-A/epichlorohydrin condensed with an amine of the structure:

where R is a $C_{13-15}$ alkyl group reacted in turn with a ketimine derived from diethylenetriamine and a ketone.

* * * * *